No. 738,580. PATENTED SEPT. 8, 1903.
R. W. STROUT.
MACHINE FOR MEASURING THE AREA OF SURFACES.
APPLICATION FILED APR. 28, 1902.
NO MODEL. 3 SHEETS—SHEET 1.
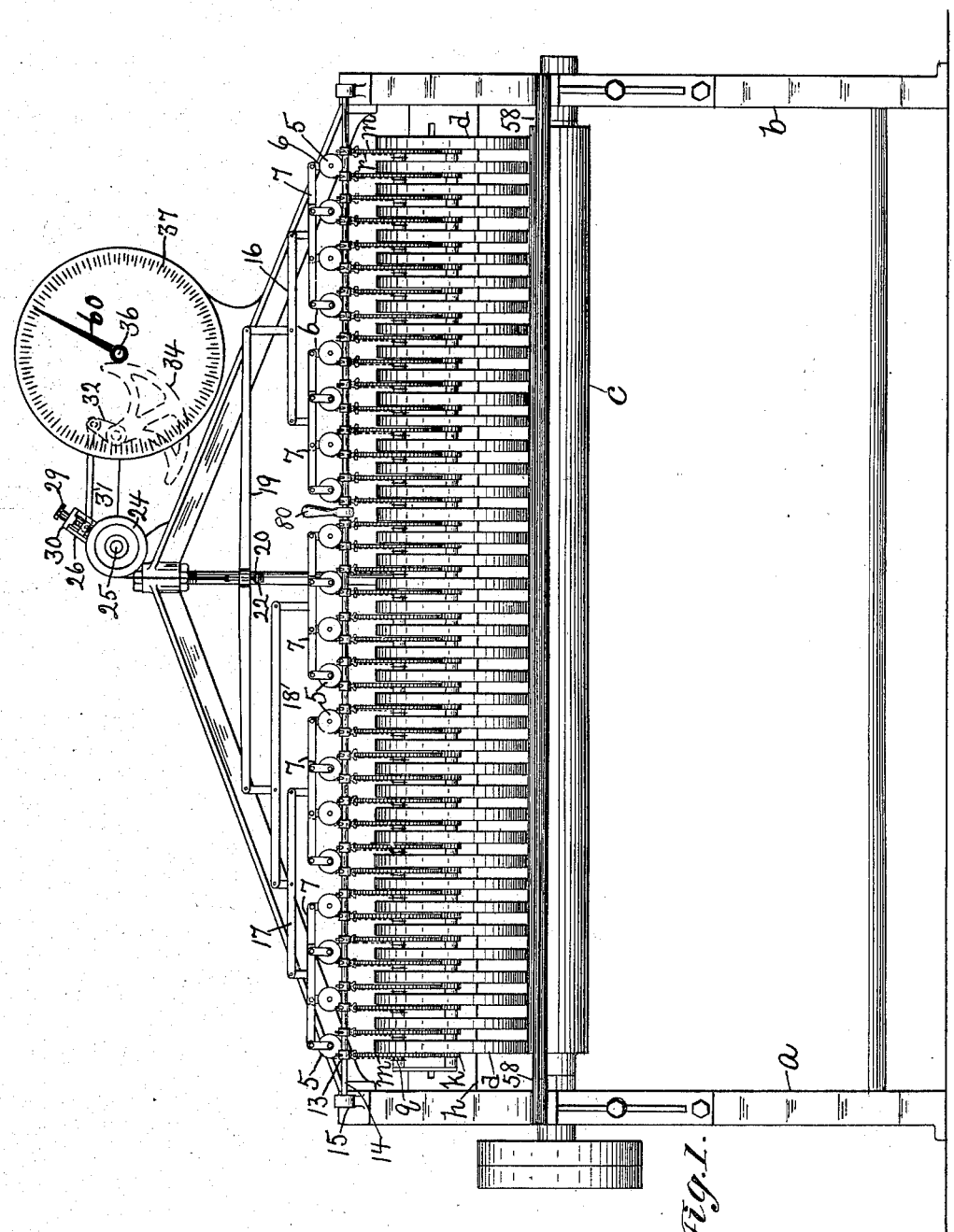
WITNESSES:
INVENTOR.
Robert W. Strout
BY Jas. H. Churchill
ATTORNEY.

No. 738,580. PATENTED SEPT. 8, 1903.
R. W. STROUT.
MACHINE FOR MEASURING THE AREA OF SURFACES.
APPLICATION FILED APR. 28, 1902.
NO MODEL. 3 SHEETS—SHEET 2.
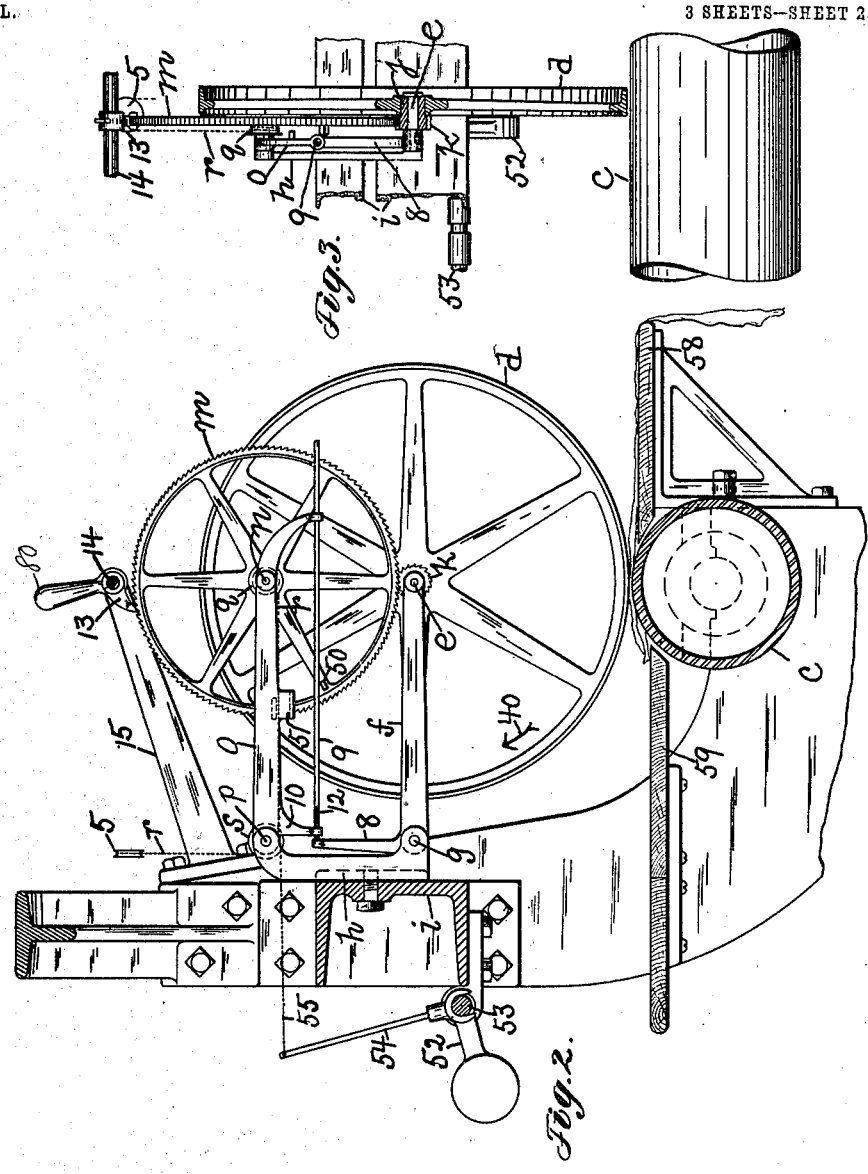
WITNESSES:
INVENTOR.
Robert W. Strout
BY
Jas. H. Churchill
ATTORNEY.

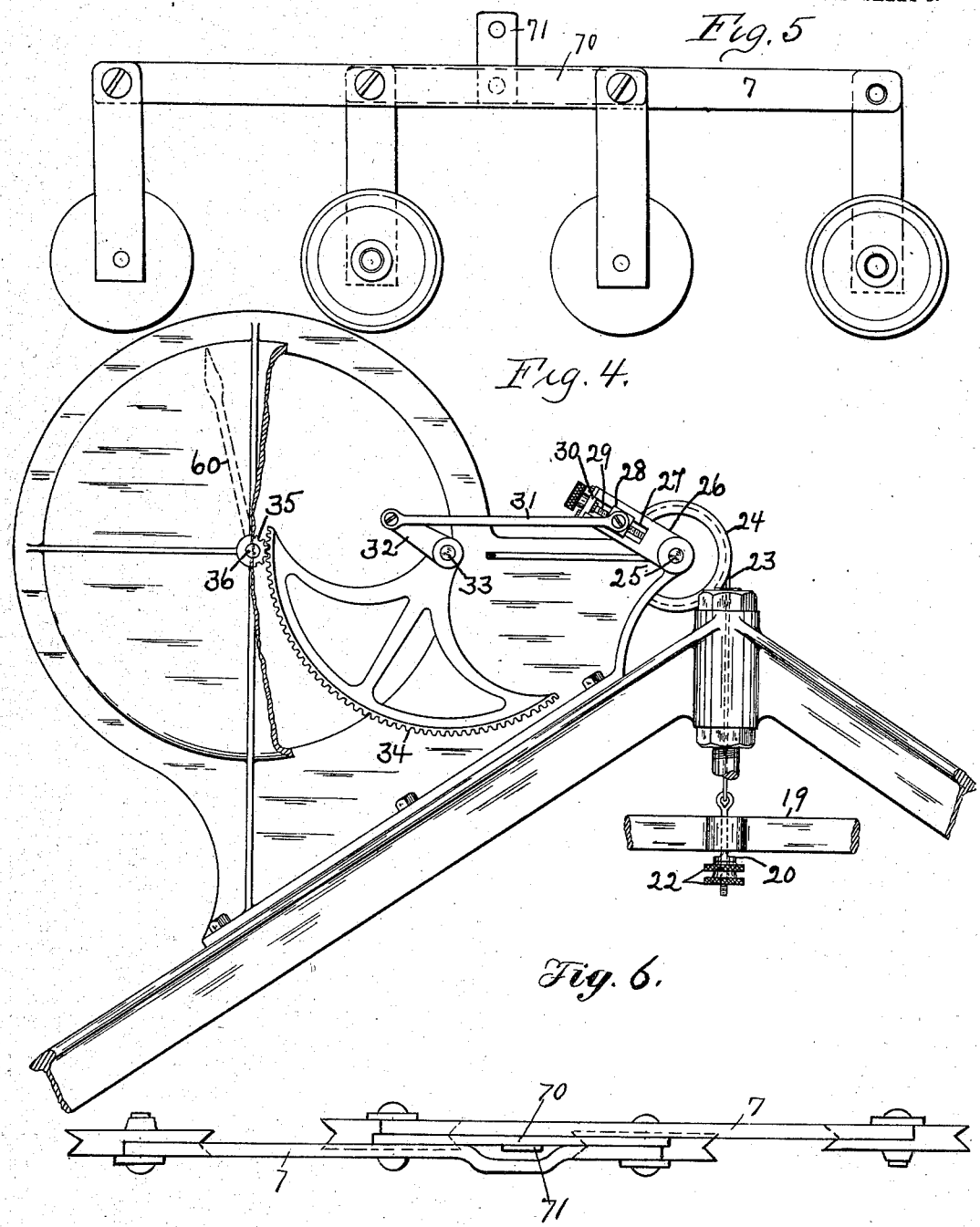

No. 738,580. Patented September 8, 1903.

UNITED STATES PATENT OFFICE.

ROBERT W. STROUT, OF SALEM, MASSACHUSETTS, ASSIGNOR TO VAUGHN MACHINE COMPANY, OF BOSTON, MASSACHUSETTS, A CORPORATION OF WEST VIRGINIA.

MACHINE FOR MEASURING THE AREA OF SURFACES.

SPECIFICATION forming part of Letters Patent No. 738,580, dated September 8, 1903.

Application filed April 28, 1902. Serial No. 105,104. (No model.)

*To all whom it may concern:*

Be it known that I, ROBERT W. STROUT, of Salem, county of Essex, and State of Massachusetts, have invented an Improvement in Machines for Measuring the Areas of Surfaces, of which the following description, in connection with the accompanying drawings, is a specification, like letters on the drawings representing like parts.

This invention relates to a machine for measuring the surface area of material in sheet form and is especially designed and adapted for measuring and registering the surface area of hides, skins, and leather.

The present invention has for its object to provide a measuring-machine which when adjusted for measuring thin stock can be used without readjustment for measuring thicker stock.

The invention further has for its object to provide a machine with which a more accurate registration of the surface measured may be obtained.

These and other features of this invention will be pointed out in the claims at the end of this specification.

Figure 1 is a front elevation of a measuring-machine embodying this invention; Fig. 2, a sectional detail, on an enlarged scale, of a portion of the machine shown in Fig. 1; Fig. 3, a detail in section and elevation of the machine shown in Fig. 2 looking toward the left; Fig. 4, a detail, on an enlarged scale, of the upper portion of the machine shown in Fig. 1 looking from the rear of the machine; Fig. 5, a detail in elevation, on an enlarged scale, of the compounding levers shown in Fig. 1; and Fig. 6, a plan view of the levers shown in Fig. 5.

Referring to the drawings, *a b* represent side frames or uprights which support in suitable bearings a bed-roll *c*, which is rotated in any suitable manner. The bed-roll *c* has coöperating with it a series of rotatable measuring devices, preferably wheels *d*, each of which, as shown in Figs. 2 and 3, is mounted on a shaft or pin *e*, supported at the end of the long arm of an elbow-lever *f*, pivoted at *g* in a bracket *h*, secured to a cross-bar *i*, forming part of the framework of the machine.

The measuring-wheel *d* is provided, as shown, with a hub *j*, having teeth *k*, which form a pinion, with which coöperates a rotatable toothed device, preferably a wheel or gear *m*, mounted on a shaft *n*, supported by the long arm of an elbow-lever *o*, mounted on a pivot *p*, which is supported by the bracket *h* substantially in line with the pivot *g* for the elbow-lever *f*. The toothed wheel *m* has attached to it a drum *q*, to which one end of a chain or other flexible connection *r* is fastened, the said chain passing under a drum or pulley *s*, mounted on the pivot *p* for the lever *o*, and then over a pulley 5, carried by a link 6, attached to a lever 7. (See Fig. 1.) The chain *r* after passing over the pulley 5 passes down under a pulley or drum *s* and is connected with the drum *q* of the next adjacent toothed wheel or gear *m*, coöperating with the next adjacent measuring-wheel.

The elbow-lever *f* is provided with a short arm 8, with which coöperates the end of an adjusting-rod 9, which is carried by the elbow-lever *o*, the latter having a short arm 10 extended toward the short arm 8 of the lever *f* and being provided with a screw-threaded eye, which is engaged by the screw-threaded portion 12 of the adjusting-rod 9, the latter at its front end being extended through an eye in a downwardly-extended front portion of the elbow-lever *o*.

The toothed wheel or gear *m* has coöperating with it a holding-pawl 13, fast on a rock-shaft 14, having bearings in suitable brackets or arms 15, attached to the side frames *a b*.

By means of the adjusting-rod 9 the toothed wheel *m* may be positioned with relation to the pinion *k*, so that the elevation of the measuring-wheel *d* by the thinnest work to be measured will cause the pinion *k* to engage the wheel *m*, with the result that as the work is fed through the machine the device *d* is rotated, which in turn rotates the toothed wheel *m*, thereby winding up the chain *r* on the drum *q* and actuating the pointer 60 of the registering mechanism, as will be described. By reason of the fact that the drum *s* is concentric with the pivot *p* for the lever *o* the further elevation of the wheel *d* by thicker work does not interfere with the accuracy of the machine, which does not have to be readjusted for thicker work, for the reason that the length of the chain $r$ between the drum $q$ and the drum or pulley $s$ does not change, being substantially constant. This is an important feature practically, as errors due to unevenness in the thickness of the hide or skin being measured are avoided, for the chain or flexible connection $r$ is maintained taut under all conditions, thus avoiding retrograde movements of the pointer or index 60, which would take place if the relation of the levers $f$ $o$ was changed, so as to produce slack in the said chain.

In the present instance the measuring-wheels $d$ are connected in pairs by the chain $r$, passing over the pulley 5, and the said pulleys are supported from the levers 7, herein shown as ten in number and connected in pairs, as represented in Fig. 1 and more clearly shown in Figs. 5 and 6, each pair of levers 7 being pivoted to the opposite ends of a bar 70, to which is attached at its center a link 71, two of which links are connected to the lever 16, two to the lever 17, and one to the lever 18, which latter is also connected to the lever 17. The levers 16 18 are connected to the lever 19, which is fulcrumed on a knife-edge washer 20, retained on a threaded rod 21 by nuts 22, the said rod being extended through the lever 19 and hung by the flexible connection or chain 23 from a drum 24, mounted on a shaft 25, (see Figs. 1 and 4,) provided with a crank or arm 26, having, as herein shown, a longitudinally-extended slot 27, in which is fitted a sliding block 28, which is adjustably secured in said slot by a threaded rod or screw 29, extended through and revoluble in a cap-piece 30, covering said slot. The sliding block 28 is joined by a link 31 to a crank 32 on a shaft 33, upon which is fastened a segmental gear 34, which engages a pinion 35, fast on the shaft 36, to which the index or pointer 60 is secured. The pointer 60 coöperates with a dial 37, having thereon suitable graduation indicative of the surface area.

In operation with the machine herein shown the wheels $d$ are normally resting upon the bed-roll $c$, and the toothed wheel $m$ is adjusted by means of the rod 9, so as to just clear the pinion $k$, thus leaving the wheels $d$ in contact with the roll $c$ free to be revolved by the latter without moving the index or pointer. When, however, a hide or skin to be measured is inserted between the wheels $d$ and the bed-roll, as represented in Fig. 2, those wheels in contact with the hide or skin are raised and the wheels $m$ are simultaneously lowered until the pinions $k$ are engaged with their coöperating toothed wheels $m$, so that the rotation of the wheels $d$ in the direction indicated by the arrow 40, Fig. 2, produces movement of the index or pointer over the dial 37.

When the material passed through the machine is thicker than that for which the machine is first adjusted, it is unnecessary with this machine to readjust it for said thicker material, inasmuch as the measuring-wheels $d$ and their coöperating toothed wheels $m$ can be elevated by the thicker stock without effecting movement of the index or pointer, owing to the fact that the status of the chain $r$ is not changed by the elevation of the wheel $m$, because the distance between the drum $q$ and the drum or pulley $s$ remains the same or substantially the same under all conditions.

By means of the adjusting-screw 29 the sliding block 28 can be moved toward or from the shaft 25, so as to vary the throw of the crank, and thus move the pointer, so as to adjust the machine to measure accurately. For this purpose a hide or skin or other surface whose area is known is used as a standard and is run through the machine, and if the pointer or index indicates on the scale more or less than the standard or known area the sliding block 28 is adjusted in its slot until the pointer or index registers the correct area.

The adjusting-screw 29 and the adjusting-rod 9 are both accessible by the operator from the front of the machine. The toothed wheels are returned to their normal position, with a lug 50 on the wheel in engagement with a lug or projection 51 on the lever $o$, by a counter-weighted lever 52, loose on a shaft 53 and having its arm 54 joined by a chain or other flexible connection 55 with the chain $r$ beyond the pivot $p$. The pawls 13 may be disengaged from the toothed wheels $m$ by the operator rocking or turning the shaft 14 in the proper direction through the handle or crank 80 on said rock-shaft. The weight of the segment 34 is sufficient to maintain the chain 23 and the portion of the chain $r$ above the pivot $p$ under proper tension at all times.

The machine is provided, as herein shown, with suitable tables 58 59, located on opposite sides of the bed-roll, as represented in Fig. 2.

I claim—

1. In a machine of the character described, in combination, a plurality of measuring-wheels, pinions attached thereto, a plurality of toothed wheels coöperating with said pinions, elbow-levers supporting said measuring and toothed wheels, and provided with arms extended toward each other, and an adjusting device extended through one of said arms and engaging the other, substantially as described.

2. In a machine of the character described, in combination, a plurality of measuring-wheels, pinions attached thereto, a plurality of toothed wheels coöperating with said pinions, levers in which said wheels are mounted, an index or pointer, means connecting said index or pointer with said toothed wheels, said means including a flexible portion attached to the toothed wheel near its hub or center and passed about the pivot for the lever supporting said toothed wheel, and means connected with said flexible portion to automatically return the toothed devices to their starting position, substantially as described.

3. In a machine of the character described, in combination, an index or pointer, a shaft provided with a crank or arm having a slot, a block slidable in said slot, mechanism connecting said index or pointer with said sliding block, means to adjust said sliding block in its slot, measuring-wheels, and means to transmit rotation of said measuring-wheels to said crank-shaft, substantially as described.

4. In a machine of the character described, in combination, an index or pointer, a shaft provided with a crank or arm, mechanism connecting said index or pointer with said crank or arm, means for adjusting the connection of said mechanism with said crank or arm to vary the throw of said crank or arm, measuring-wheels, and means to transmit rotation of said measuring-wheels to said crank-shaft, substantially as described.

5. In a machine of the character described, in combination, an index or pointer, a shaft on which it is mounted, a pinion on said shaft, a segmental gear in mesh with said pinion, a shaft provided with a crank, a device movable longitudinally on said crank, mechanism connecting said device with said segmental gear, measuring-wheels, and mechanism to transmit rotation of said measuring-wheels to said crank-shaft, substantially as described.

6. In a machine of the character described, in combination, a plurality of measuring-wheels, elbow-levers in which said measuring-wheels are mounted, pinions attached to said wheels, rotatable toothed devices cooperating with said pinions, elbow-levers in which said toothed devices are mounted, said levers having arms extended toward each other, and means cooperating with said arms for adjusting the rotatable toothed devices and measuring-wheels relative to each other, substantially as described.

7. In a machine of the character described, in combination, a rotatable toothed device, a pivoted support in which said device is mounted to rotate, a rotatable measuring device provided with means for engagement with said rotatable toothed device, means to support said measuring device, a registering device, and means connecting said registering device with said rotatable toothed device, said means including a flexible portion passed about the pivot of the support for said rotatable toothed device and connected with said rotatable toothed device, whereby the support for the rotatable toothed device may be turned on its pivot without effecting the registering mechanism, and means connected with said flexible portion to automatically return the toothed devices to their starting position, substantially as described.

8. In a machine of the character described, in combination, a rotatable measuring device adapted to make contact with the surface to be measured, a rotatable toothed device cooperating with said measuring device, a registering mechanism, means for connecting said registering mechanism with said rotatable toothed device, including a flexible portion and means for permitting bodily movement of the rotatable toothed device without operating the registering mechanism, and means connected with said flexible portion to automatically return the toothed devices to their starting position, substantially as described.

In testimony whereof I have signed my name to this specification in the presence of two subscribing witnesses.

ROBERT W. STROUT.

Witnesses:
JAS. H. CHURCHILL,
J. MURPHY.